United States Patent
Simeonov et al.

(10) Patent No.: US 10,584,988 B2
(45) Date of Patent: Mar. 10, 2020

(54) RIVER DISCHARGE AND DEPTH ESTIMATION

(71) Applicant: The Government of the United States of America, as represented by the Secretary of the Navy, Arlington, VA (US)

(72) Inventors: Julian A. Simeonov, New Orleans, LA (US); Kenneth Todd Holland, Diamondhead, MS (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 15/639,996

(22) Filed: Jun. 30, 2017

(65) Prior Publication Data
US 2018/0010936 A1    Jan. 11, 2018

Related U.S. Application Data

(60) Provisional application No. 62/359,284, filed on Jul. 7, 2016.

(51) Int. Cl.
*G01F 1/00*      (2006.01)
*G01B 21/18*   (2006.01)

(52) U.S. Cl.
CPC ............. *G01F 1/002* (2013.01); *G01B 21/18* (2013.01)

(58) Field of Classification Search
CPC .................................. G01F 1/002; G01B 21/18
See application file for complete search history.

(56) References Cited

U.S. PATENT DOCUMENTS

| | | | |
|---|---|---|---|
| 8,676,555 B2 * | 3/2014 | Blain | G06F 17/5018 703/6 |
| 2012/0089381 A1 * | 4/2012 | Chu | G01W 1/00 703/6 |

OTHER PUBLICATIONS

Barton, G. J., R. R. McDonald and J.M. Nelson, Simulation of Streamflow Using a Multidimensional Flow Model for White Sturgeon Habitat, Kootenai River near Bonners Ferry, Idaho—A Supplement to Scientific Investigations Report 2005-5230, U.S. Geological Survey Scientific Investigations Report 2009-5026.

(Continued)

*Primary Examiner* — Matthew G Marini
(74) *Attorney, Agent, or Firm* — US Naval Research Laboratory; William P. Ladd (57) ABSTRACT

Embodiments relate to estimating river discharge and depth. Initially, observed velocities are used to generate a maximum velocity streamline for a river section, which is then used with an observed shoreline to construct a streamline curvilinear grid. The grid is used to interpolate scattered velocity data points, which are used with a bottom friction of the river section to approximate mean total head slope values. A least squares minimization scheme is applied to a velocity-slope relationship to estimate a bottom friction and discharge coefficient by fitting a difference in the predicted mean total head elevation values between upstream and downstream ends of the river section to a respective ζ-average of the measured total head values of the river section. Discharge of the river section is determined based on the coefficient and a velocity-depth relationship and then used to generate a river forecast.

18 Claims, 7 Drawing Sheets

(56) References Cited

OTHER PUBLICATIONS

Chen, W. and R. P. Mied, 2013, River velocities from sequential multispectral remote sensing images, Water Resour. Res., 49, 3039-3103.

Costa, J. E., R. T. Cheng, F. P. Haeni, N. Melcher, K. R. Spicer, E Hayes, W. Plant, K. Hayes, C. Teague, and D. Barrick, 2006, Use of radars to monitor stream discharge by noncontact methods, Water Resour. Res., 42,W07422.

Dugan, J. P., S. P. Anderson, C. C. Piotrowski, and S. B. Zuckerman, 2013, Airborne infrared remote sensing of riverine currents, IEEE Trans. Geosci. Remote Sens., doi:10.1109/TGRS.2013.2277815.

Honnorat, M., J. Monnier, and F.-X. Le Dimet, 2008, Lagrangian data assimilations for river hydraulics simulations, Comput. Visualization Sci., 12, 235-246.

Kinzel, Paul J., Carl J. Legleiter, and Jonathan M. Nelson, 2012. Mapping River Bathymetry with a Small Footprint Green LiDAR: Applications and Challenges. Journal of the American Water Resources Association (JAWRA), 49(1): 183-204.

Landon, K. C., G. W. Wilson, H. T. Ozkan-Haller and J. H. MacMahan, 2014, Bathymetry Estimation Using Drifter-Based Velocity Measurements on the Kootenai River, Idaho, J. Atmos. Ocean. Tech., 31, 503-514.

Legleiter, C. J., Kinzel, P. J. and B. T. Overstreet, 2011, Evaluating the potential for remote bathymetric mapping of a turbid, sand-bed river: 2. Application to hyperspectral image data from the Platte River, Water Resour. Res., 47, W09532.

Nelson, J. M., J. P. Bennet and S. M. Wiele, 2003, Flow and sediment transport modeling, Ch. 18, p. 539-576, in "Tools in Geomorphology", M. Kondolph and H. Piegay, eds., Wiley and Sons.

Rodríguez, E., 2009. SWOT Science Requirements Document. JPL Document, Initial Release. <http://swot.jpl.nasa.gov/files/SWOT_science_reqs_final.pdf>.

Shiono, K., and D. W. Knight, 1991, Turbulent open channel flows with variable depth across the channel, J. Fluid Mech., 376, 221-261.

Zaron, E. D., M.-A. Pradal, P. D. Miller, A. F. Blumberg, N. Georgas, W. Li, and J. M. Cornuelle, 2011: Bottom topography mapping via nonlinear data assimilation. Journal of Atmospheric and Oceanic Technology, 28 (12), 1606-1623.

* cited by examiner

RIVER DISCHARGE AND DEPTH ESTIMATION

CROSS-REFERENCE TO RELATED APPLICATIONS

This application is a non-provisional application claiming priority to provisional application 62/359,284 filed on Jul. 7, 2016, under 35 USC 119(e). The entire disclosure of the provisional application is incorporated herein by reference.

BACKGROUND

Depth estimations in uncharted rivers would enable safe navigation and flood hazard predictions. Radar and optical instruments and techniques have been developed to remotely measure water depth but are typically of limited use in deep or turbid river waters where significant attenuation and scattering of the electromagnetic signal occurs. There is also an indirect approach that estimates river depth based on the local hydrodynamic relationship between the steady currents in simple one-layer shallow flows and the depth. This inverse hydrodynamic approach requires measurements of the surface velocity field and/or elevation, and the estimation of other model parameters such as the discharge and the bottom friction. Several image-tracking techniques have now been developed that are capable of determining surface currents with 10-30 m spatial resolution from airborne infrared imagery or satellite-borne multispectral imagery. Additionally, global observations of water surface elevation with an estimated 100 m resolution and 1 cm vertical accuracy are anticipated from the planned NASA's Surface Water and Ocean Topography (SWOT) altimeter.

SUMMARY

Embodiments relate to estimating river discharge and depth. Initially, observed velocities are used to generate a maximum velocity streamline for a river section, which is then used with an observed shoreline to construct a streamline curvilinear grid. The grid is used to interpolate scattered velocity data points, which are used with a bottom friction of the river section to approximate mean total head slope values. A least squares minimization scheme is applied to a velocity-slope relationship to estimate a bottom friction and discharge coefficient by fitting a difference in the predicted mean total head elevation values between upstream and downstream ends of the river section to a respective $\zeta$-average of the measured total head values of the river section. Discharge of the river section is determined based on the coefficient and a velocity-depth relationship and then used to generate a river forecast.

DESCRIPTION

Embodiments of the invention allow for simultaneous estimation of discharge and depth for a river. An example method uses analytical velocity-depth and velocity-slope relationships obtained through simplification of the shallow water equations as described below with respect to FIG. 1. In this example, the velocity-slope relationship is used to estimate the discharge, which can then be used to estimate the depth with the velocity-depth relationship.

Figure 1:
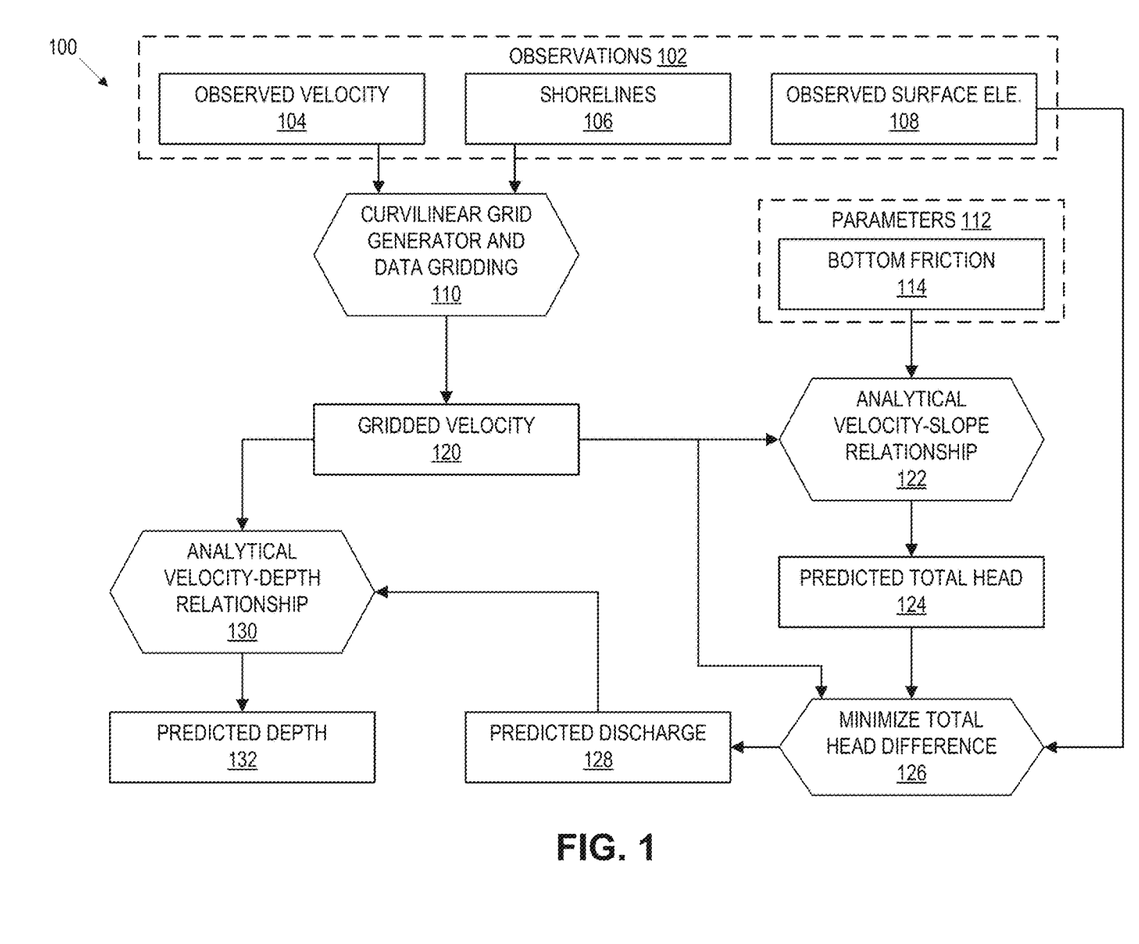
FIG. 1 shows an example workflow for estimating river discharge and depth.

FIG. 1 shows an example workflow 100 for estimating river discharge and depth.

Initially, observations 102 including observed velocity 104, shorelines 106, and observed surface elevations 108 are obtained for a river section. The observed velocity 104 and shorelines 106 can be used to generate a streamline curvilinear grid 110.

Figure 3:
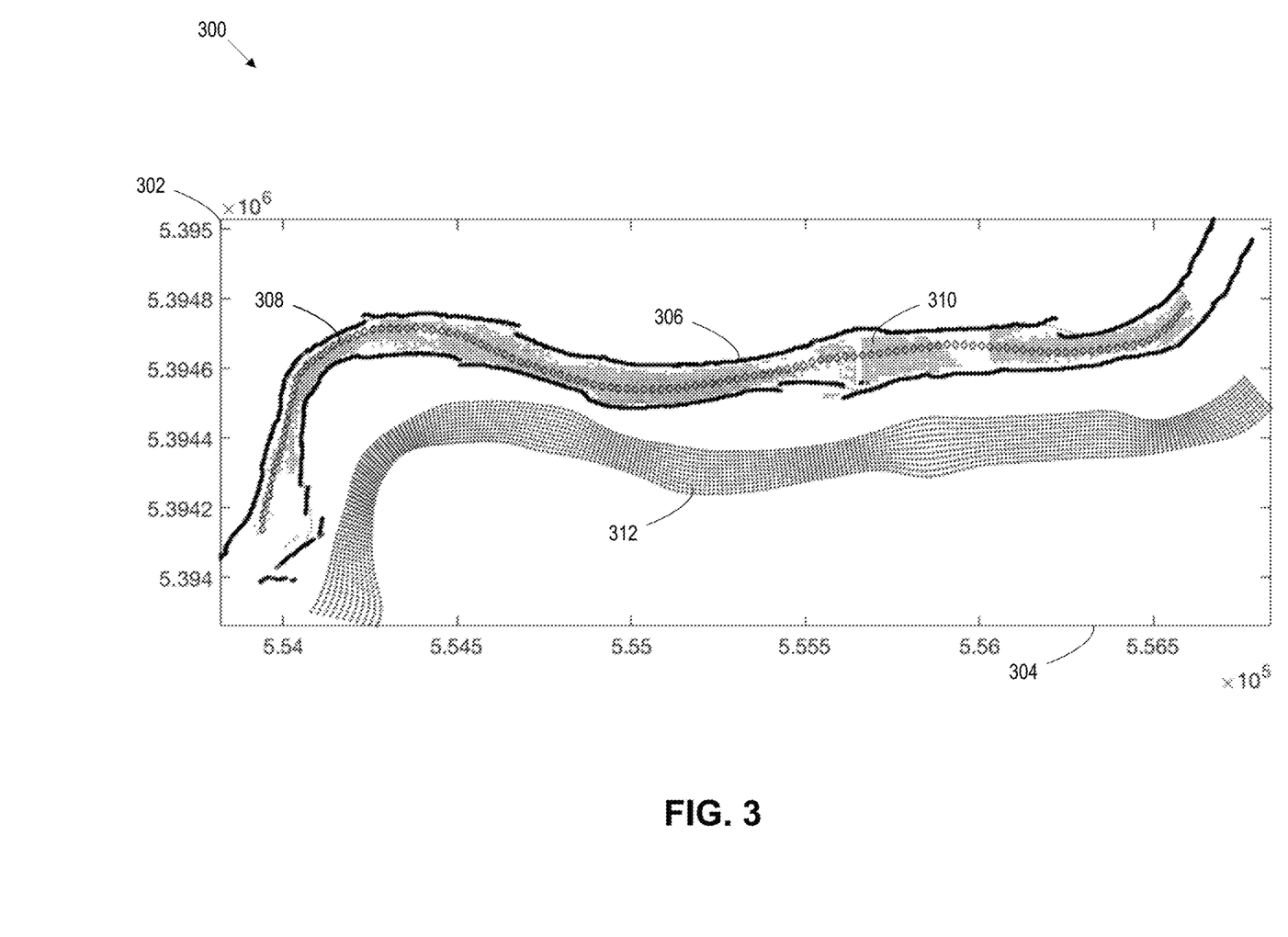
FIG. 3 shows an example streamline curvilinear grid.

To generate the streamline curvilinear grid 110, a maximum velocity streamline (e.g., 308 in FIG. 3) is created by choosing a starting point $r_1$ near the velocity maximum at the upstream end. Subsequent points on the streamline are determined by integrating the measured velocity field $u^{obs}$ (e.g., 310 in FIG. 3) as follows:

$$r_{i+1} = r_i + \Delta\eta \frac{u^{obs}(r_i)}{|u^{obs}|}, \quad (1)$$

where $\Delta\eta$ is a fixed distance increment comparable to the resolution of the measured velocity. Interpolation of the measured data is used to estimate the velocity field at the next streamline point. When the streamline integration encounters a small data gap, the value of $\Delta\eta$ can be increased. The curvilinear grid (e.g., 312 in FIG. 3) is constructed by dividing the segment between the two shorelines into equal intervals for each streamline point (e.g., 310 in FIG. 3). The number of cross-channel nodes is the same for each downstream location, but the resulting cross-stream grid step varies in the downstream direction proportional to the river width. Once the streamline curvilinear grid (e.g., 312 in FIG. 3) is generated, the gridded velocity data points are interpolated 120 on the streamline grid (e.g., 312 in FIG. 3) and the cross-channel integral in Equation (10) is estimated using trapezoidal quadratures.

In general, the workflow 100 is for estimating the discharge Q and the water depth h from a known velocity field U and water surface elevation profile $z_S$, based on an analytical inversion of a simplified equation of motion for the streamwise depth-averaged flow U:

$$hgS = -C_D U^2 \quad (2)$$

where $$S = \frac{\partial}{\partial \eta}\left(\frac{U^2}{2g} + z_S\right) \quad (3)$$

is the streamwise gradient of the total head $z_T = z_S + U^2/2g$, g is gravity, $\eta$ and $\zeta$ are the respective local downstream/cross-stream coordinates, $$C_D = \frac{gn^2}{h^{1/3}} \quad (4)$$

is the bottom drag coefficient and n is the Manning's roughness coefficient. The analytical inversion relies upon a number of simplifications of the model equations, which include the use of a local reference frame $(\eta, \zeta)$ aligned with the streamlines. The momentum balance (2) neglects momentum transfer by secondary flows and lateral mixing by turbulence, which are relatively unimportant for in-bank flow in wide channels. Another simplifying assumption is that the total head is cross-channel uniform, in which case a simple finite difference estimate of the total head slope:

$$S(\eta, \zeta) = \frac{\Delta z_T(\eta)}{\Delta \eta(\zeta)} \quad (5)$$

implies that the $\zeta$-variation of the local total head slope is just the result of the $\zeta$-variation of the downstream distance $\Delta\eta$ between the two total head levels separated by $\Delta Z_T$ (i.e. the total head slope is reduced near the outer bank of a bend). The $\zeta$-average of (5) then allows us to express S in terms of its $\zeta$-average $\overline{S}$:

$$S(\eta, \zeta) = \frac{\overline{S}(\eta)}{\Delta \eta_0(\zeta)} \quad (6)$$

and a simple factor:

$$\Delta \eta_0(\zeta) = \Delta \eta \overline{\left(\frac{1}{\Delta\eta}\right)} \quad (7)$$

that is a known function of the local channel curvature/geometry.

In block 122, equations (2) and (6) are used together with mass conservation:

$$Q = \int_{\zeta_L}^{\zeta_R} hUD\zeta = \text{const}, \quad (8)$$

and the following velocity-slope relationship is obtained:

$$\overline{S}(\eta) = \frac{n^2}{Q^{4/3}} I^{4/3}, \quad (9)$$

where:

$$I(\eta) = \int_{\zeta_L}^{\zeta_R} \Delta_0^{3/4} U^{5/2} d\zeta \quad (10)$$

is a 1D function that is completely determined by the velocity observations and the channel geometry.

Equations (2), (6) and (9) indicate that the depth solution depends on two unknown parameters—the discharge Q and the bottom roughness n, which is related to a bottom friction 114 parameter 112. Predicted surface elevation values can be determined from the velocity-slope relationship in block 124. Next in block 126, equation (9) can be used in a least squares minimization scheme to estimate the coefficient $n^2/Q^{4/3}$ by fitting the predicted mean total head elevation difference between the upstream and downstream ends of the reach:

$$\Delta \overline{z}_{mod} = \int_{\eta_{down}}^{\eta_{up}} \overline{S} d\eta \quad (11)$$

to the respective $\zeta$-average of the measured total head field (observed surface elevation 108):

$$\Delta \overline{z}_{obs} = \int_{\zeta_L}^{\zeta_R} (z_T(\zeta, \eta_{up}) - z_T(\zeta, \eta_{down})) d\zeta \quad (12)$$

Alternative schemes that use all possible pairs of upstream-downstream measurement points within a hydraulically well-defined reach do not provide any advantage. Assuming a known bottom roughness 114, then the predicted $n^2/Q^{4/3}$ ratio provides an estimate for the discharge in block 128.

In block 130, equations (2), (4), (6) and (9) are used to obtain the velocity-depth relationship:

$$h = \frac{Q}{I} \Delta \eta_0^{3/4} U^{3/2} \quad (13)$$

which can then be used to approximate depth values in block 132.

Figure 2:
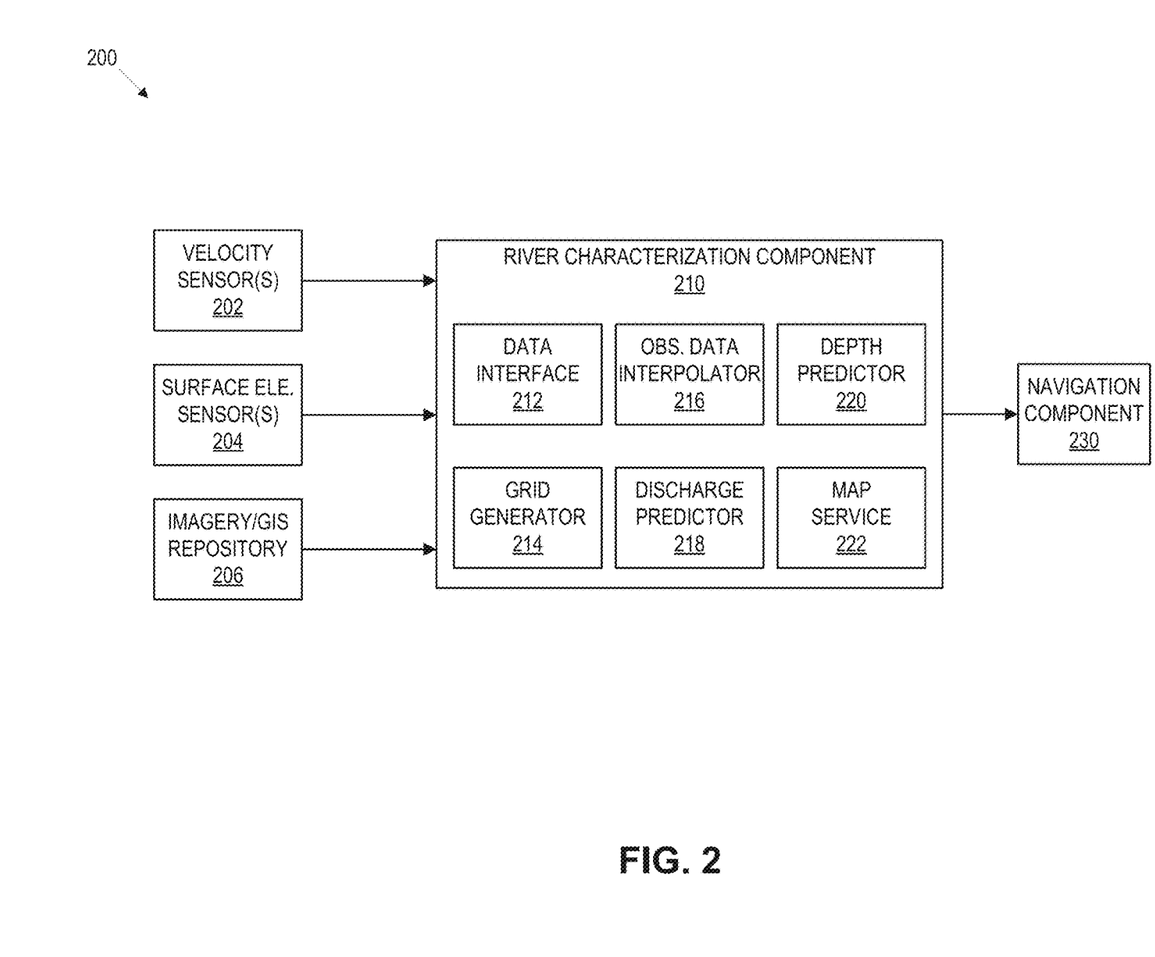
FIG. 2 shows an example system for estimating river discharge and depth.

FIG. 2 shows an example system 200 for estimating river discharge and depth. The estimation system 200 includes velocity sensor(s) 202, surface elevation sensor(s) 204, imagery/geographic information system (GIS) repository 206, a river characterization component 210, and a navigation component 230.

Velocity sensor(s) 202 can be one or more remote sensing video systems deployed from airborne or space borne platforms. The velocity sensor(s) 202 are capable of remotely sensing velocity data for a target river section from a distance (e.g., from an airplane or from a satellite). Velocity data collected by the velocity sensor(s) 202 can be, for example, transmitted to the river characterization system 210 via wireless transmission.

Surface elevation sensor(s) 204 can be one or more of, for example, light detection and ranging sensor, an altimeter, remote sensing systems, etc. Surface elevation sensor(s) 204, similar to velocity sensor(s) 202 is capable of remotely sensing elevation data for the river section. Surface elevation data collected by the surface elevation sensor(s) 204 can be transmitted to the river characterization system 210 via various methods such as wireless transmission, manual data collection, wired transmission, etc.

Imagery/GIS repository 206 can be a database, distributed database, data storage device, combination thereof, etc. that is configured to store spatial data and/or imagery. The spatial data can include, but is not limited to, shorelines, GIS data files such as a geodatabase or a shapefile, etc. The imagery can include, but is not limited to, airborne infrared imagery, satellite-borne multi spectral imagery, etc.

River characterization component 210 includes data interface 212, grid generator 214, velocity analyzer 216, discharge predictor 218, depth predictor 220, and map service 222. The data interface 212 receives data from the velocity sensor(s) 202, the surface elevation sensor(s) 204, and the imagery/GIS repository 206. In some cases, the data interface 212 can be configured to receive the data directly from the sensor or repository via a wired or wireless protocol. In other cases, the data interface 212 can be configured to receive the data indirectly such as through an intermediate database, physically transported data files that are collected at the location of the sensors, etc.

Grid generator 214 generates streamline curvilinear grids as described above with respect to FIG. 1. For example when a target river section is identified by a user of river characterization system 210, grid generator 214 can generate a streamline curvilinear grid for the target river section based on data inputs from the velocity sensor(s) 202 and the image/GIS repository 206.

Figure 4:
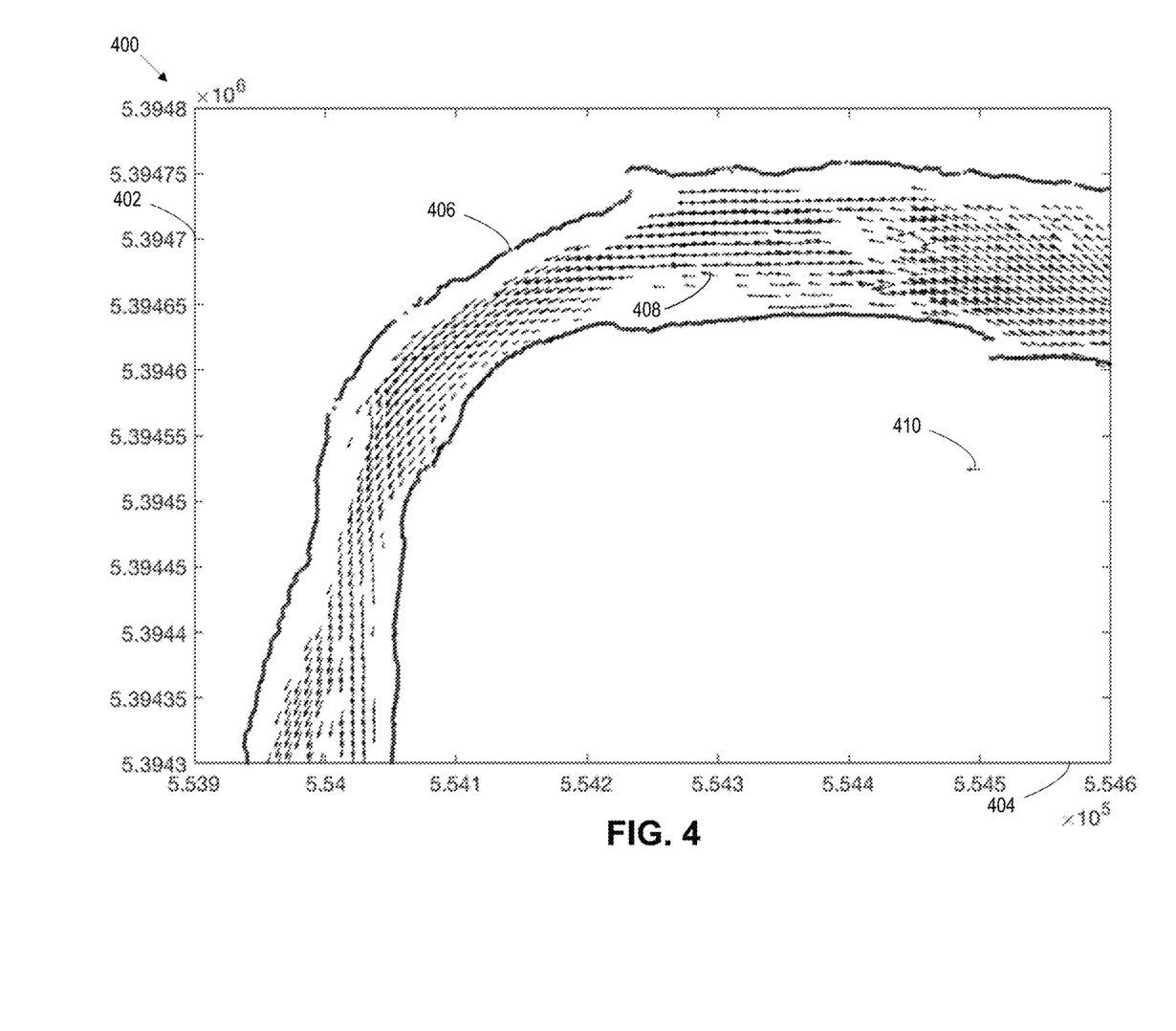
FIG. 4 shows example gridded velocity data points.

Observational data interpolator 216 performs analysis based on the outputs of the grid generator 214. Specifically, observational data interpolator 216 uses the streamline curvilinear grids to interpolate gridded velocity points as described above with respect to FIG. 1. The gridded velocity points describe the direction and velocity magnitude at specific locations (e.g., coordinates) in a river section. An example of gridded velocity points is shown in FIG. 4. The gridded velocity data can then be used by the other modules (e.g., discharge predictor 218, depth predictor 220, etc.) of the river characterization component 210.

Observational data interpolator 216 also approximates the mean total head slope based on the velocity data points and the measured water surface elevation. The gridded total head field is used as an input in the discharge predictor 220.

Discharge predictor 218 predicts discharge values as described above with respect to FIG. 1. Specifically, discharge predictor 218 predicts discharge values for the river section based on the predicted total head slope from the velocity-slope relationship and the gridded total head field from the observational data interpolator 216.

Depth predictor 220 predicts depth values as described above with respect to FIG. 1. Specifically, depth predictor 220 predicts depths values for the river section based on a velocity-depth relationship using the gridded velocity points from the observational data interpolator 216 and the predicted discharge values from the discharge predictor 218. The predicted discharge and depth values can be incorporated into a 3D model of the river section.

Map service 222 performs GIS functions for the river characterization system 210. For example, map service 222 can generate a river forecast based on the discharge values and depth values. Specifically, the 3D model of the river section can be used to generate a river forecast that describes the characteristics of the river flow at the river location over time. Map server 222 can also allow a user to interact with the river forecast so that it can be modified, used to generate maps, rendered on a display, interfaced with a navigation component 230, etc.

Navigation component 230 is used to control the navigation of a watercraft. For example, navigation component 230 may use the river forecast to assist a user in avoiding collisions while navigating the watercraft at the river location. In another example, the navigation component 230 can track the current location of the watercraft so that the watercraft location as determined by a global positioning system (GPS) can be rendered in the 3D model of the river section. In this case, the forecasted and discharge and depth values can used in the 3D model to identify/display hazards that are proximate to the watercraft location as it is updated in real-time.

FIG. 3 shows an example streamline curvilinear grid 312 for a location on the Kootenai River. The data inputs for the streamline curvilinear grid 312 are plotted on a 2D grid 300 with a y-axis 302 representing northing and an x-axis 304 representing easting in meters. The shoreline 306 is rendered based on an observed shoreline of the river section. The maximum velocity streamline 308 is determined based on the measured velocities 310. After the maximum velocity streamline 308 is determined, the streamline curvilinear grid 312 is generated as discussed above with respect to FIG. 1.

FIG. 4 shows example gridded velocity data points 408 in units of meters per second (m/s) obtained over a section of the Kootenai River when the discharge was 213 cubic meters per second. The velocity data points 408 are plotted on a 2D grid 400 with a y-axis 402 representing northing and an x-axis 404 representing easting. The shoreline 406 is rendered based on an observed shoreline of the river section. Reference arrow 410 shows an arrow length for a reference magnitude of 1 m/s. The velocity data points 408 can be used as, for example, the measured velocities 310 of FIG. 3.

Figure 5:
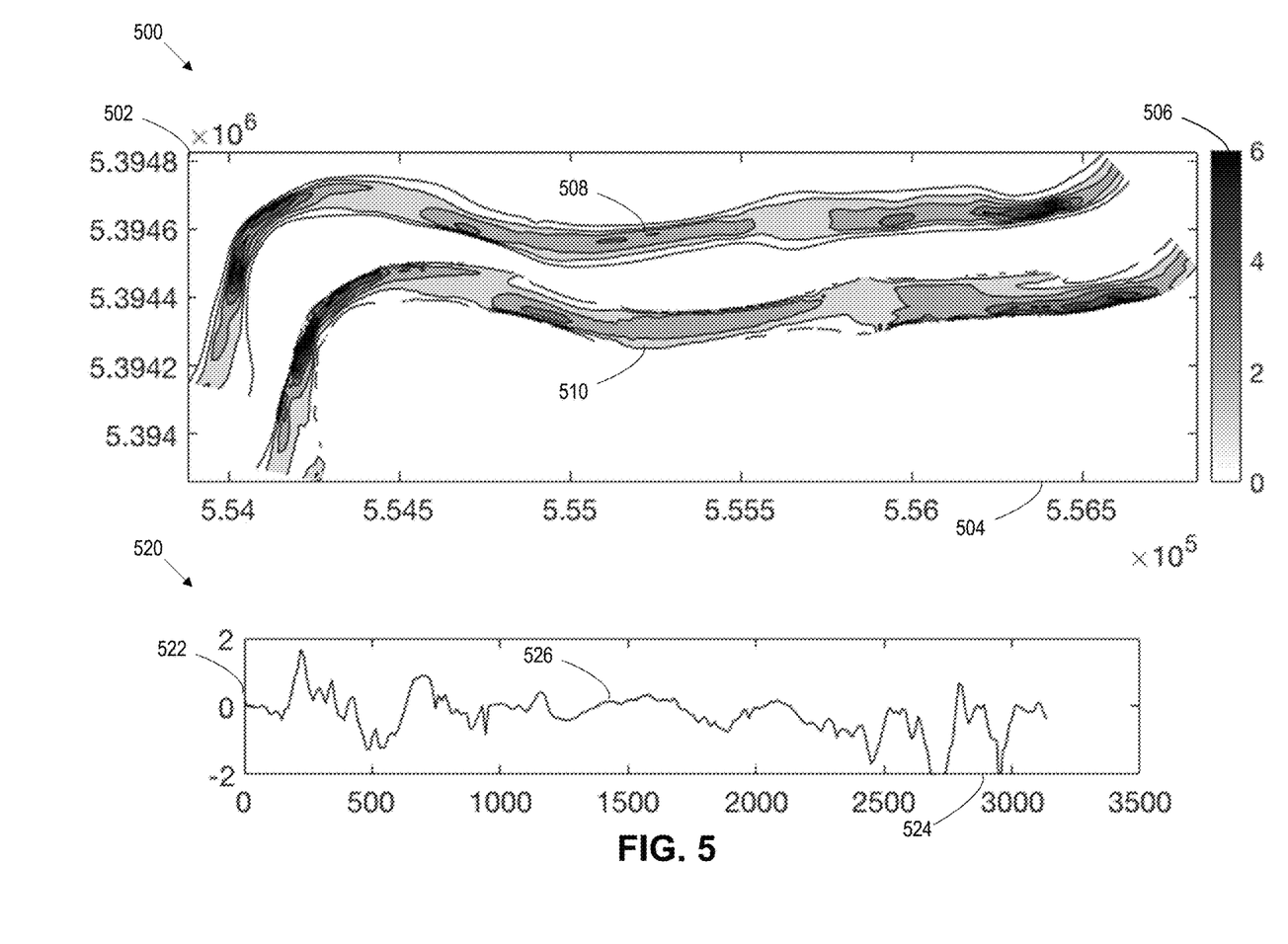
FIG. 5 shows an example comparison of predicted and measured depth of a river section.

FIG. 5 shows an example comparison of predicted 508 and measured depth 510 of a river section using the velocity data from FIG. 4. The depths 508, 510 are plotted on a 2D grid 500 with a y-axis 502 representing northing and an x-axis 504 representing easting. The depths 508, 510 are also shaded according to their depth 506 in units of meters. For this example, a Manning roughness n=0.0271 was used in the least square fit of the measured total head to estimate the river discharge as Q=209 cubic meters per second. The remotely sensed surface velocity is converted to depth-averaged velocity using a ratio of 0.79 determined from the acoustic Doppler current profiler measurements. The result in FIG. 5 demonstrates that embodiments of the invention are capable of predicting the spatial pattern of water depths and the river discharge.

The second grid 520 in FIG. 5 shows the downstream variation of the maximum depth error 526. The maximum depth error 526 is plotted on a 2D grid 520 with a y-axis 522 representing difference in meters and an x-axis 504 representing downstream distance in meters. The maximum depth error 526 indicates that most of the bias in the predicted depth is located near the downstream end of the domain. Embodiments of the invention provide depth predictions with accuracy that are similar to that of existing methods while at the same time also predicting the discharge.

Figure 6:
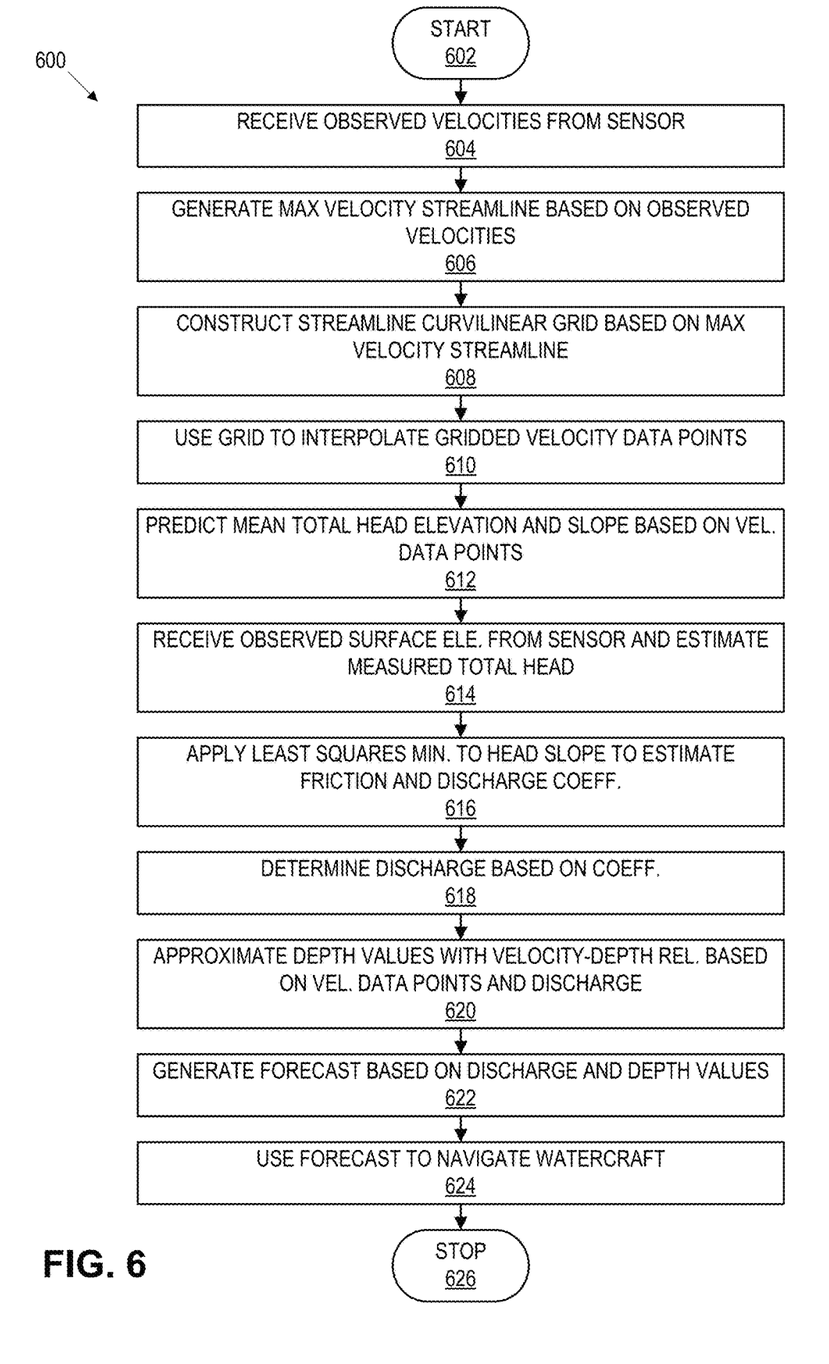
FIG. 6 shows an example workflow for navigating a watercraft.

FIG. 6 shows an example workflow 600 for navigating a watercraft. As is the case with the other processes described herein, various embodiments may not include all of the steps described below, may include additional steps, and may sequence the steps differently. Accordingly, the specific arrangement of steps shown in FIG. 6 should not be construed as limiting the scope of using a river forecast to navigate a watercraft.

In block 602, the workflow 600 starts and proceeds to block 604, where observed velocities are received from a sensor. The observed velocities may be similar to the velocities shown in FIG. 4. In block 606, a maximum velocity streamline is generated based on the observed velocities. The maximum velocity streamline may be generated by (1) selecting a starting point of the maximum velocity streamline, where the starting point is near a velocity maximum of an upstream end of the river section and (2) determining subsequent points of the maximum velocity streamline by integrating the observed velocities of the river section. Interpolation of the observed velocities is used to estimate a velocity field of each for the subsequent points.

In block 608, a streamline curvilinear grid is constructed based on the maximum velocity streamline. Specifically, the streamline curvilinear grid is constructed by passing a cross-stream line through each streamline point in the maximum velocity streamline and dividing segments between shorelines of the river section into equal intervals. In block 610, the streamline curvilinear grid is used to interpolate gridded velocity data points.

In block 612, mean total head slope values are approximated for the river section based on the gridded velocity data points and a bottom friction of the river section. In block 614, observed surface elevation values are received from a surface elevation sensor that is located at the river location, and the observed surface elevation values and gridded velocity data points are then used to estimate measured total head values for the river section. In block 616, a least squares minimization scheme is applied to the velocity-slope relationship to estimate a bottom friction and discharge coefficient by using the mean total head slope values to fit a predicted mean total head elevation difference between upstream and downstream ends of the river section to a respective ζ-average of a measured total head value of the river section, where the measured total head value is determined based on the observed surface elevation values.

In block 618, a discharge of the river section is determined based on the bottom friction and discharge coefficient. In block 620, depth values are approximated based on the velocity-depth relationship and the discharge. In block 622, the river forecast is generated based on the predicted depth and discharge values. In block 624, the river forecast is used to navigate a watercraft. For example, the location of the watercraft can be displayed in real-time within a rendering of the river forecast. In this example, hazards proximate to the watercraft location can be highlighted so that the bearing of the watercraft can be updated to avoid the hazards. In other cases such as an unmanned vessel, the bearing of the unmanned vessel can be updated automatically based on hazards that are identified using the river forecast. In block 626, the workflow 600 can stop.

Figure 7:
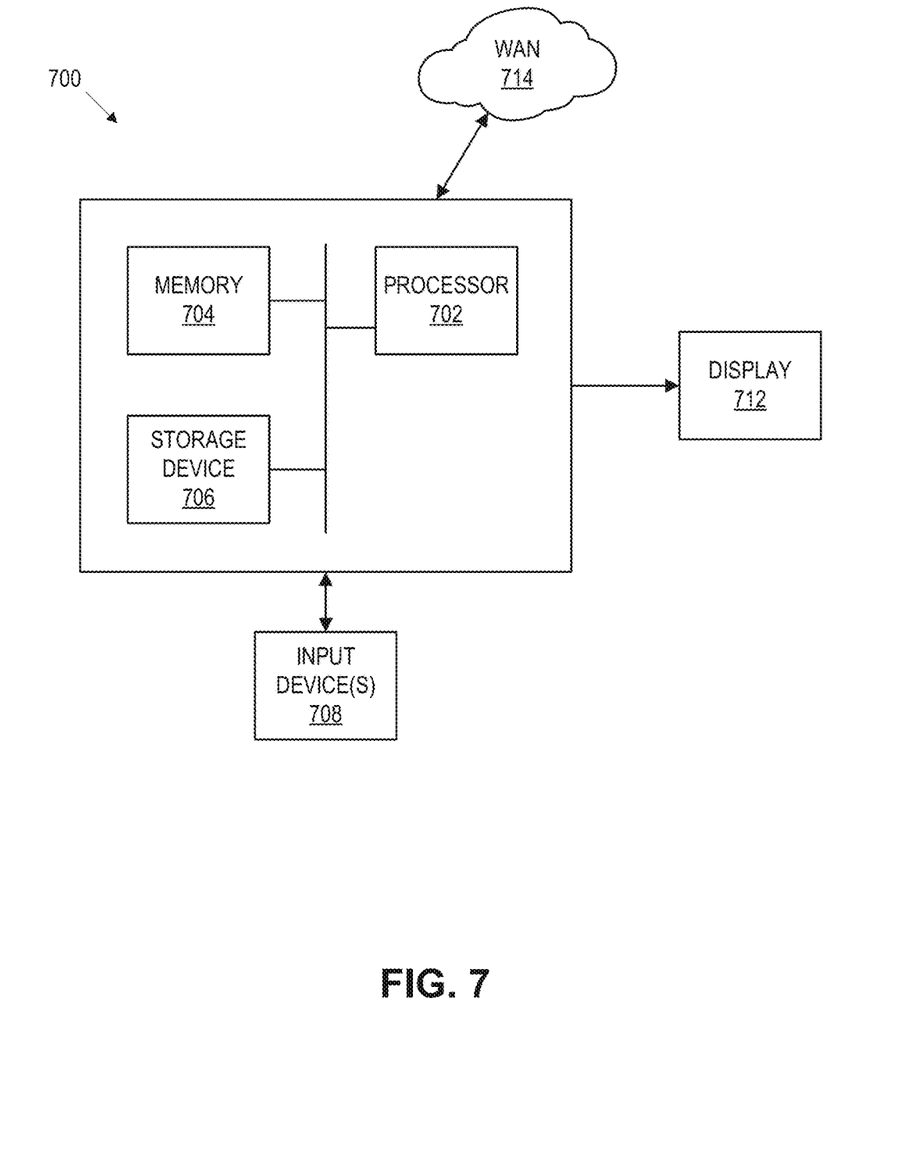
FIG. 7 shows a diagram of an example computer system for executing a river discharge and depth estimation system.

The invention may be implemented on virtually any type of computer regardless of the platform being used. For example, as shown in FIG. 7, a computer system 700 includes a processor 702, associated memory 704, a storage device 706, and numerous other elements and functionalities typical of today's computers (not shown). The computer 700 may also include input means 708, such as a keyboard and a mouse, and output means 712, such as a monitor. The computer system 700 may be connected to a local area network (LAN) or a wide area network (e.g., the Internet) 714 via a network interface connection (not shown). Those skilled in the art will appreciate that these input and output means may take other forms.

Further, those skilled in the art will appreciate that one or more elements of the aforementioned computer system 700 may be located at a remote location and connected to the other elements over a network. Further, the invention may be implemented on a distributed system having a plurality of nodes, where each portion of the invention (e.g., map service, navigation component, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for estimating river discharge and depth, the method comprising:
receiving observed velocities from a velocity sensor device, wherein the velocity sensor device remotely senses the observed velocities from a river section;
using the observed velocities to generate a maximum velocity streamline for the river section;
constructing a streamline curvilinear grid based on the maximum velocity streamline and an observed shoreline of the river section;
using the streamline curvilinear grid to interpolate gridded velocity data points on the curvilinear grid;
predicting mean total head elevation values and mean total head slope values for the river section based on the gridded velocity data points and a bottom friction of the river section;
receiving observed surface elevation values from a surface elevation sensor device, wherein the surface elevation sensor device remotely senses the observed surface elevation values from the river section;
estimating measured total head values of the river section based on gridded velocity data points and the observed surface elevation values;
applying a least squares minimization scheme to a velocity-slope relationship to estimate a bottom friction and discharge coefficient by fitting a difference in the predicted mean total head elevation values between upstream and downstream ends of the river section to a respective ζ-average of the measured total head values of the river section;
determining a discharge of the river section based on the bottom friction and discharge coefficient;
generating a river forecast for the river section based on the discharge; and
transmitting the river forecast to a navigation component on a watercraft.

2. The method of claim 1, further comprising:
approximating depth values with a velocity-depth relationship based on the gridded velocity data points and the discharge, wherein the river forecast is further generated based on the depth values.

3. The method of claim 1, wherein using the observed velocities to generate the maximum velocity streamline further comprises:
selecting a starting point of the maximum velocity streamline, wherein the starting point is near a velocity maximum of the upstream end of the river section; and
determining subsequent points of the maximum velocity streamline by integrating the observed velocities of the river section, wherein interpolation of the observed velocities is used to estimate a velocity field of each of the subsequent points.

4. The method of claim 3, wherein constructing the streamline curvilinear grid further comprises:
passing a cross-stream line through each streamline point in the maximum velocity streamline; and
dividing segments between shorelines of the river section into equal intervals.

5. The method of claim 1, further comprising:
using the river forecast to navigate the watercraft in the river section.

6. The method of claim 1, wherein the velocity sensor device is a remote sensing video device.

7. A system for estimating river discharge and depth, the system comprising:
a velocity sensor device configured to remotely collect observed velocities from a river section;
a grid generator configured to:
use the observed velocities to generate a maximum velocity streamline for the river section; and
construct a streamline curvilinear grid based on the maximum velocity streamline and an observed shoreline of the river section;

an observational data interpolator configured to:
  use the streamline curvilinear grid to interpolate gridded velocity data points; and
  predict mean total head elevation values and mean total head slope values for the river section based on the gridded velocity data points and a bottom friction of the river section;
a surface elevation sensor device configured to remotely collect observed surface elevation values from the river section;
a discharge predictor configured to:
  estimate measured total head values of the river section based on gridded velocity data points and the observed surface elevation values;
  apply a least squares minimization scheme to a velocity-slope relationship to estimate a bottom friction and discharge coefficient by fitting a difference in the predicted mean total head elevation values between upstream and downstream ends of the river section to a respective $\zeta$-average of the measured total head values of the river section; and
  determine a discharge of the river section based on the bottom friction and discharge coefficient;
a map service configured to generate a river forecast for the river section based on the discharge; and
a navigation component configured to use the river forecast to navigate a watercraft in the river section.

8. The system of claim 7, further comprising a depth predictor configured to:
approximate depth values with a velocity-depth relationship based on the gridded velocity data points and the discharge, wherein the river forecast is further generated based on the depth values.

9. The system of claim 7, wherein the grid generator uses the observed velocities to generate the maximum velocity streamline by:
selecting a starting point of the maximum velocity streamline, wherein the starting point is near a velocity maximum of the upstream end of the river section; and
determining subsequent points of the maximum velocity streamline by integrating the observed velocities of the river section, wherein interpolation of the observed velocities is used to estimate a velocity field of each of the subsequent points.

10. The system of claim 9, wherein the grid generator constructs the streamline curvilinear grid by:
passing a cross-stream line through each streamline point in the maximum velocity streamline; and
dividing segments between shorelines of the river section into equal intervals.

11. A method for navigating a watercraft, the method comprising:
generating a maximum velocity streamline for a river section using observed velocities;
constructing a streamline curvilinear grid based on the maximum velocity streamline and an observed shoreline of the river section;
interpolating gridded velocity data points on the curvilinear grid;
predicting mean total head elevation values and mean total head slope values for the river section based on the gridded velocity data points and a bottom friction of the river section;
estimating measured total head values of the river section based on gridded velocity data points and observed surface elevation values;
applying a least squares minimization scheme to a velocity-slope relationship to estimate a bottom friction and discharge coefficient by fitting a difference in the predicted mean total head elevation values between upstream and downstream ends of the river section to a respective $\zeta$-average of the measured total head values of the river section;
determining a discharge of the river section based on the bottom friction and discharge coefficient;
generating a river forecast for the river section based on the discharge; and
sending navigation instructions, based on the river forecast, to a navigation component of a watercraft.

12. The method of claim 11, further comprising:
receiving the observed velocities from a velocity sensor device, wherein the velocity sensor device remotely senses the observed velocities from the river section.

13. The method of claim 11, further comprising:
receiving the observed surface elevation values from a surface elevation sensor device, wherein the surface elevation sensor device remotely senses the observed surface elevation values from the river section.

14. The method of claim 11, further comprising:
controlling a navigation of the watercraft based on the instructions.

15. The method of claim 11, further comprising:
approximating depth values with a velocity-depth relationship based on the gridded velocity data points and the discharge, wherein the river forecast is further generated based on the depth values.

16. The method of claim 11, wherein generating the maximum velocity streamline further comprises:
selecting a starting point of the maximum velocity streamline, wherein the starting point is near a velocity maximum of the upstream end of the river section; and
determining subsequent points of the maximum velocity streamline by integrating the observed velocities of the river section, wherein interpolation of the observed velocities is used to estimate a velocity field of each of the subsequent points.

17. The method of claim 16, wherein constructing the streamline curvilinear grid further comprises:
passing a cross-stream line through each streamline point in the maximum velocity streamline.

18. The method of claim 17, wherein constructing the streamline curvilinear grid further comprises:
dividing segments between shorelines of the river section into equal intervals.

* * * * *